United States Patent [19]

Merritt

[11] Patent Number: 5,009,207

[45] Date of Patent: Apr. 23, 1991

[54] INTERNAL COMBUSTION ENGINE

[76] Inventor: Dan Merritt, 139 Baginton Road, Coventry, England

[21] Appl. No.: 347,821

[22] Filed: May 5, 1989

[30] Foreign Application Priority Data

May 7, 1988 [GB] United Kingdom ............... 8810871
Apr. 24, 1989 [GB] United Kingdom ............... 8909185

[51] Int. Cl.$^5$ ............................................ F02B 19/00
[52] U.S. Cl. ................................. 123/261; 123/59 BS;
123/65S; 123/260; 123/263; 123/272; 123/276;
123/279; 123/307
[58] Field of Search ............... 123/59 BS, 65 S, 70 R,
123/71 R, 72, 306, 307, 260, 261, 263, 267, 268,
270, 272, 276, 277, 279–281, 282, 285, 286

[56] References Cited

U.S. PATENT DOCUMENTS

| 642,176 | 1/1900 | Thomson | 123/53 A |
|---|---|---|---|
| 2,234,267 | 3/1941 | Mallory | 123/53 A |
| 2,246,019 | 6/1941 | Steinlein | 123/73 C |
| 3,916,840 | 11/1975 | Geiger | 123/263 |
| 3,923,019 | 12/1975 | Yamada | 123/53 BA |
| 3,934,562 | 1/1976 | Isaka | 123/53 BA |
| 3,970,057 | 7/1976 | Schauer | 123/53 BA |
| 4,070,999 | 1/1978 | Matsuno | 123/260 |
| 4,106,445 | 8/1978 | Beveridge | 123/53 BA |
| 4,425,884 | 1/1984 | Thring et al. | 123/272 |
| 4,483,289 | 11/1984 | Paul et al. | 123/269 |

FOREIGN PATENT DOCUMENTS

| 458854 | 3/1928 | Fed. Rep. of Germany . |
|---|---|---|
| 666222 | 9/1938 | Fed. Rep. of Germany . |
| 1187225 | 9/1959 | France . |
| 58-77121 | 5/1983 | Japan . |
| 301908 | 9/1954 | Switzerland . |

*Primary Examiner*—Noah P. Kamen
*Attorney, Agent, or Firm*—Renner, Otto, Boisselle & Sklar

[57] ABSTRACT

An internal combustion engine has a pair of first and second cylinders (12,14) communicating with a combustion chamber (20) the first cylinder having a larger swept volume than the second cylinder. First and second pistons (16,18) are provided in the cylinders. An inlet port is provided in the first cylinder for delivering a charge of unthrottled fuel while a fuel injector (36) is controlled by a control means (37) to deliver a charge of fuel into the second cylinder (14) as soon as possible after commencement of an induction stroke of the second piston. Movement of the fuel/air mixture from the second cylinder (14) into the combustion chamber (20) is prevented until the second piston (18) is at or near its inner dead center position. The second piston (18) may be formed as a protrusion on the crown of the first piston (16) with the second cylinder (14) being an extension of the first cylinder (12). The engine can be a compression ignition engine in which ignition takes place spontaneously in the combustion chamber, or alternatively a catalyst or hot surface ignition means can be provided in the combustion chamber.

39 Claims, 4 Drawing Sheets

INTERNAL COMBUSTION ENGINE

BACKGROUND OF THE INVENTION

1. Field of the Invention

The present invention relates to internal combustion engines.

An internal combustion engine system can be subdivided into a number of inter-related sub-systems which operate together to bring about a desired performance in relation to speed, power output, fuel consumption and exhaust emission of the engine system. These subdivisions are:

(a) ignition means
(b) management of fuel input
(c) management of gas flow inside the engine cylinders and combustion chamber The diesel engine system, in addition, also has the following sub-systems:

(d) segregation mechanisms
(e) mixing of fuel and air in a combustion chamber

Segregation is the term used to describe the exclusion of fuel from the combustion chamber of the engine during the induction and compression strokes of the engine to prevent premature ignition when a continually operable ignition means is situated in the combustion chamber. Segregation confers a considerable fuel efficiency benefit on an internal combustion engine for the following reasons:

(i) The engine compression ratio can be chosen without regard to the fuel used since spontaneous ignition by compression can be prevented,
(ii) at partial load, the fuel input can be reduced without a deliberate reduction in air input. This results in an "ultra lean burn" operation of the engine,
(iii) at partial load there is also no need for any mechanical interference with the airflow during induction of the air, as is effected, for example, by a throttle valve which leads t pumping losses.

2. Description of the Prior Art

The diesel engine is the only internal combustion engine currently available which uses segregation in its operation. During operation, air is drawn into a cylinder of the engine and is compressed to a high volume ratio (14:1 to 25:1) as a result of which the air is heated to a high temperature of between 300° C. and 400° C. Fuel is not injected into the cylinder until the end of the compression stroke. Because of the high temperature of the air, the fuel ignites spontaneously. However, combustion does not take place immediately the fuel is injected. The fuel enters the cylinder in the form of liquid droplets. These must mix intimately with the air in the cylinder and vaporise before they can ignite to commence combustion. This inherent delay in combustion renders the combustion process a relatively slow process which limits the efficient operation of the diesel engine to relatively low speeds. The segregation referred to above is effected mechanically in the diesel engine by the fuel injection pump the injector needle of which mechanically segregates the fuel from the cylinder or combustion chamber until the moment of injection.

The present invention seeks to provide an improved internal combustion engine.

SUMMARY OF THE INVENTION

Accordingly, the present invention provides an internal combustion engine comprising at least one pair of first and second cylinders communicating with a combustion chamber, said first cylinder having a larger swept volume than said second cylinder;

first means for delivering a charge of substantially air into said first cylinder;

second means for delivering a charge of liquid fuel into said second cylinder;

respective first and second pistons movable in said cylinders;

continually operable ignition means in said combustion chamber;

control means for controlling said second means to commence delivery of said charge of fuel into said second cylinder during movement of said second piston between a first position wherein said piston is at the commencement of its induction stroke and a second position wherein said piston is not less than 10° angle of movement from the end of its compression stroke and to terminate delivery of said charge of fuel when said second piston reaches a third position no later than the inner dead centre position of the piston at the end of the compression stroke; and means for inhibiting movement of fuel/air mixture from said second cylinder into said combustion chamber prior to said second piston reaching a fourth position wherein said piston has completed at least substantially 80% of its compression stroke length and means for inducing a vortex motion in air delivered to said combustion chamber from said first cylinder for assisting rapid mixing in said combustion chamber of fuel/air mixture from said second cylinder and air from said first cylinder during combustion.

The present invention also provides a compression ignition engine comprising at least one pair of first and second cylinders communicating with a combustion chamber, said first cylinder having a larger swept volume than said second cylinder;

first means for delivering a charge of substantially air to said first cylinder;

second means for delivering a charge of liquid fuel into said second cylinder;

respective first and second pistons movable in said cylinders;

control means for controlling said second means to commence delivery of said charge of fuel into said second cylinder during movement of said second piston between a first position wherein said piston is at the commencement of its induction stroke and a second position wherein said piston is not less than 10° angle of movement from the end of its compression stroke and to terminate delivery of said charge of fuel when said second piston reaches a third position no later than the inner dead centre position of the piston at the end of the compression stroke; and means for inhibiting movement of fuel/air mixture from said second cylinder into said combustion chamber prior to said second piston reaching a fourth position wherein said piston has completed substantially 80% of its compression stroke length and means for inducing a vortex motion in air delivered to said combustion chamber from said first cylinder for assisting rapid mixing in said combustion chamber of fuel/air mixture from said second cylinder and air from said first cylinder during combustion.

An internal combustion engine according to the present invention relies on the movement of gases between two cylinders of unequal swept volume, interconnected by a common combustion chamber where ignition takes place, to promote segregation. It has been established that when both pistons of the engine move towards their inner dead centre positions gas flows from the larger cylinder, through the combustion chamber and into the smaller cylinder during most of the compression stroke. Fuel is introduced into the smaller cylinder during the induction stroke of the latter and/or a first part of the compression stroke up to the piston position at which the gas flow reverses and the content of the smaller cylinder enters the combustion chamber. Liquid fuel can be introduced into the smaller cylinder commencing over any part or all of the stroke movement of the second cylinder's piston from the inner dead centre (IDC) position of the second piston at the start of the induction stroke to not less than 10% prior to the inner dead centre position at the end of the compression stroke, over the full range of fuelling conditions from full load to idling, and ending no later than the inner dead centre position at the end of the compression stroke.

The introduction of liquid fuel into the smaller cylinder during a preselected part of the cycle prior to ignition allows the fuel time to vaporise into gas in the smaller cylinder so that when it enters the combustion chamber to ignite, the combustion process which follows involves gaseous fuel and is much more rapid in comparison with the combustion process in the diesel engine. This allows the engine according to the present invention to operate efficiently at much higher speeds than is possible with the diesel engine. In effect, the engine according to the present invention combines the efficiency of the diesel engine as a segregation engine with the high speed capability of the gasoline engine.

A number of features in a preferred form of the invention contribute to effective segregation, these being:

(a) a combination of a large swept volume cylinder containing air only (or air with such a small quantity of fuel as to render it unignitable by the ignition means in the combustion chamber, the upper limit of any such fuel/air mixture ratio being below the lower (lean) flammability limit for such a mixture) with a smaller swept volume cylinder into which the fuel is introduced. The two cylinders are interconnected by a common combustion chamber.

(b) The introduction of fuel into the smaller cylinder in liquid form cools the gases in the smaller cylinder by evaporation, so lowering the pressure there in relation to the pressure in the larger cylinder at any given piston positions during the compression stroke up to a final part of the compression stroke. This effectively promotes a flow of gas from the larger cylinder through the combustion chamber to the smaller cylinder.

(c) An optional feature is that the phase difference between the positions of the pistons in the larger and smaller cylinders can be chosen to set the crank angle at which the contents of the smaller cylinder enter the combustion chamber to initiate the ignition and combustion process.

(d) The combustion chamber communicates with the smaller cylinder by way of an aperture which restricts the flow of gas into the smaller cylinder during the induction stroke, thus affecting the pressure in the smaller cylinder at the commencement of the compression stroke in order to retain the pressure there at a lower value than the pressure in the larger cylinder.

BRIEF DESCRIPTION OF THE DRAWINGS

The present invention is further described hereinafter, by way of example, with reference to the accompanying drawings, in which.

DESCRIPTION OF THE PREFERRED EMBODIMENTS

Figure 1:
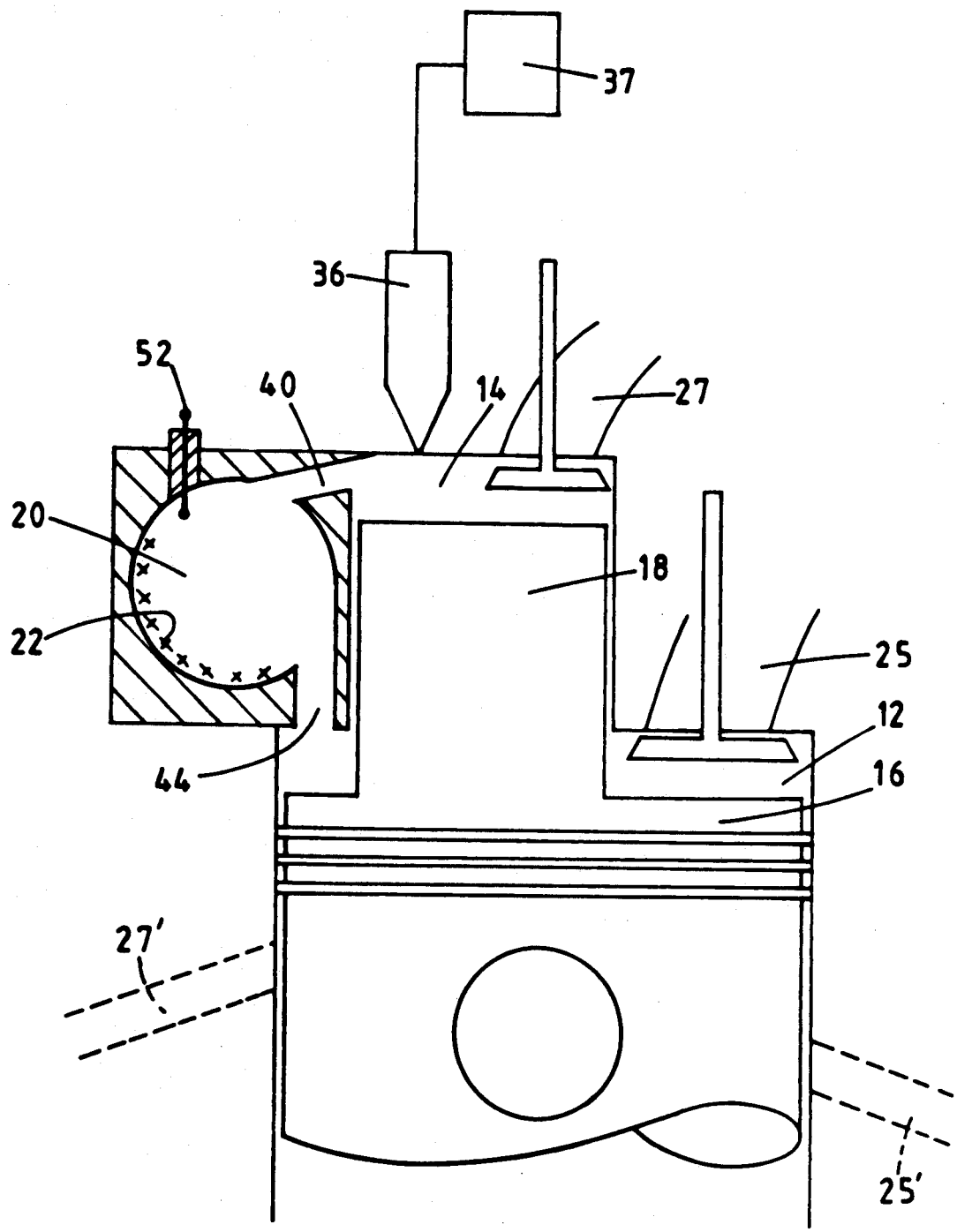
FIG. 1 is a partial section through a portion of a first embodiment of an internal combustion engine according to the present invention.

Referring firstly to FIG. 1, this is a section through a portion of a preferred form of internal combustion engine according to the present invention. For a better understanding and a complete description of the engine and its operation of the engine reference should be made to prior UK specifications numbers 2 155 546 and 2 186 913. The same reference numbers as are used in the aforementioned prior specifications are used in the accompanying drawings to identify like parts.

The engine of FIG. 1 has one or more pairs of cooperating first and second cylinders 12,14 containing respective first and second pistons 16,18. The cylinders 12,14 are interconnected by a combustion chamber 20 in the engine cylinder head. The two cylinders are formed by a larger cylinder 12 which has a cylindrical extension forming a smaller cylinder 14. The larger cylinder has a larger swept volume than the smaller cylinder. The axes of the two cylinders are parallel and although cylinder 14 is shown positioned off centre relative to the larger cylinder 12 it can be in any suitable position, including centrally of the cylinder 12. The larger cylinder 12 is provided with a first piston 16 which also, on its crown, carries a cylindrical extension projecting into the smaller cylinder 14 and forming the piston 18 for the smaller cylinder. The stroke of the first piston 16 is arranged such that the second piston 18 projects into the cylinder 14 even at its outer dead centre position.

Both cylinders 12,14 communicate with the combustion chamber 20 through respective apertures 40,44. The combustion chamber is preferably spherical, although other suitable shapes may be used and is provided with suitable ignition means 22 as described below. Fuel is introduced into the smaller cylinder 14 by means of a fuel injector 36 controlled by a control means 37 whilst air is inducted into the larger cylinder through an inlet port 25. The air inducted into the larger cylinder is preferably unthrottled, that is it is not controlled by means such as a butterfly valve as is the case with known gasoline engines. An exhaust port 27 is provided in the smaller cylinder 14. As an alternative, exhaust and air inlet 27',25' ports may open into the larger cylinder 14 as shown in dotted lines. The ports may be opened and closed by valves such as poppet valves or by the pistons themselves when the ports are in the side walls of the cylinders. Starting of the engine may be assisted by suitable means such as a spark plug or electrode 52 which may provide a continuous stream of sparks or electric arc to assist starting, or a hot surface such as a glow plug or a pre-heated surface area in the combustion chamber.

Figure 2:
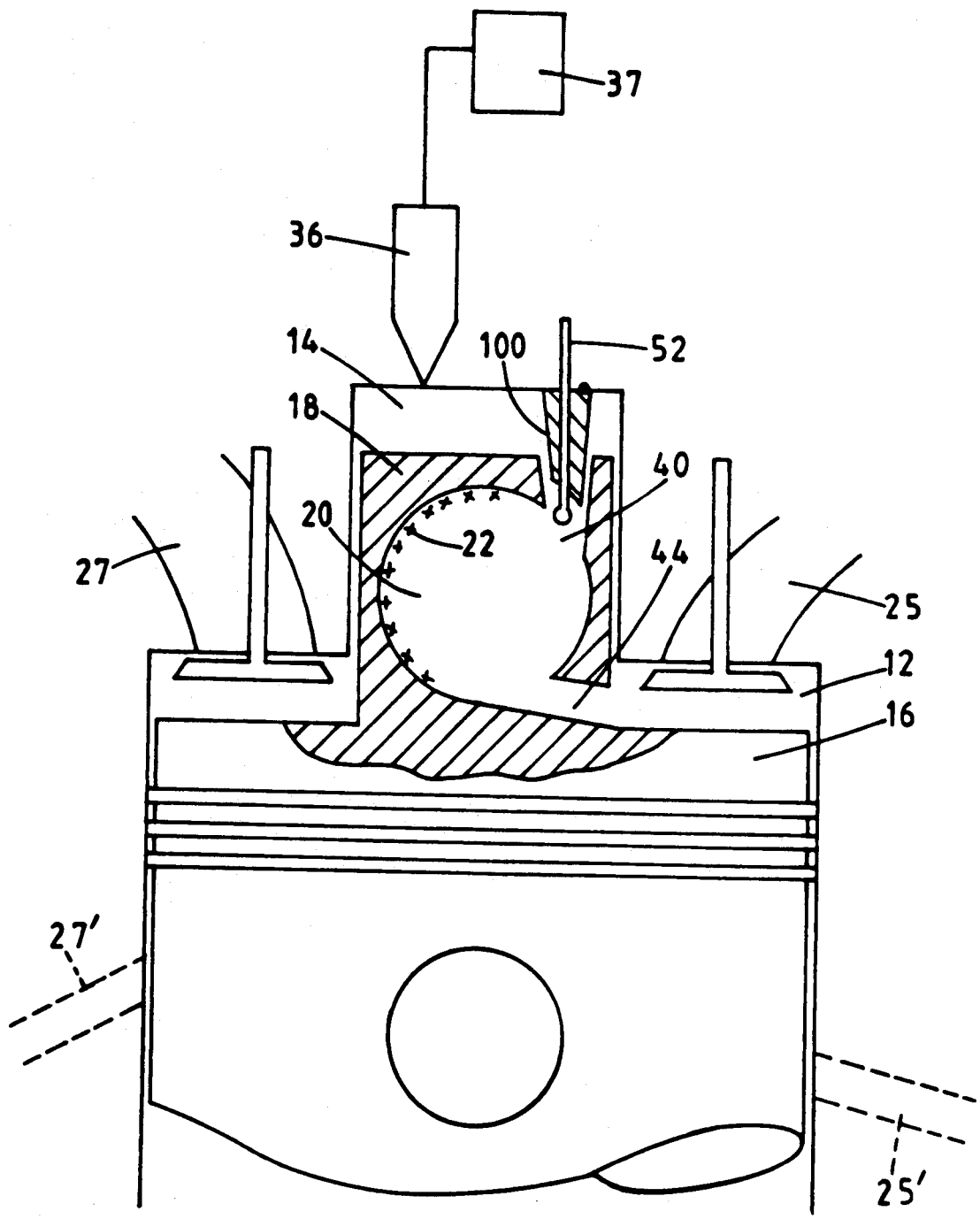
FIG. 2 is a view similar to that of FIG. 1 of a second embodiment of an internal combustion engine according to the present invention.

FIG. 2 is a view similar to that of FIG. 1 showing a modified form of engine.

In this embodiment the combustion chamber 20 is actually formed inside the second piston 18. The second piston 18 may be operated without piston rings since air will only leak from the larger cylinder 12 to the smaller cylinder 14 whilst there is a small pressure difference between the two cylinders.

The smaller cylinder 14 is also provided with a protrusion 100 formed on its end wall to displace most of the volume in aperture 40, when at or near IDC. The protrusion is positioned to enter into aperture 40 as the piston 18 approaches IDC. This is described below in more detail.

Figure 3:
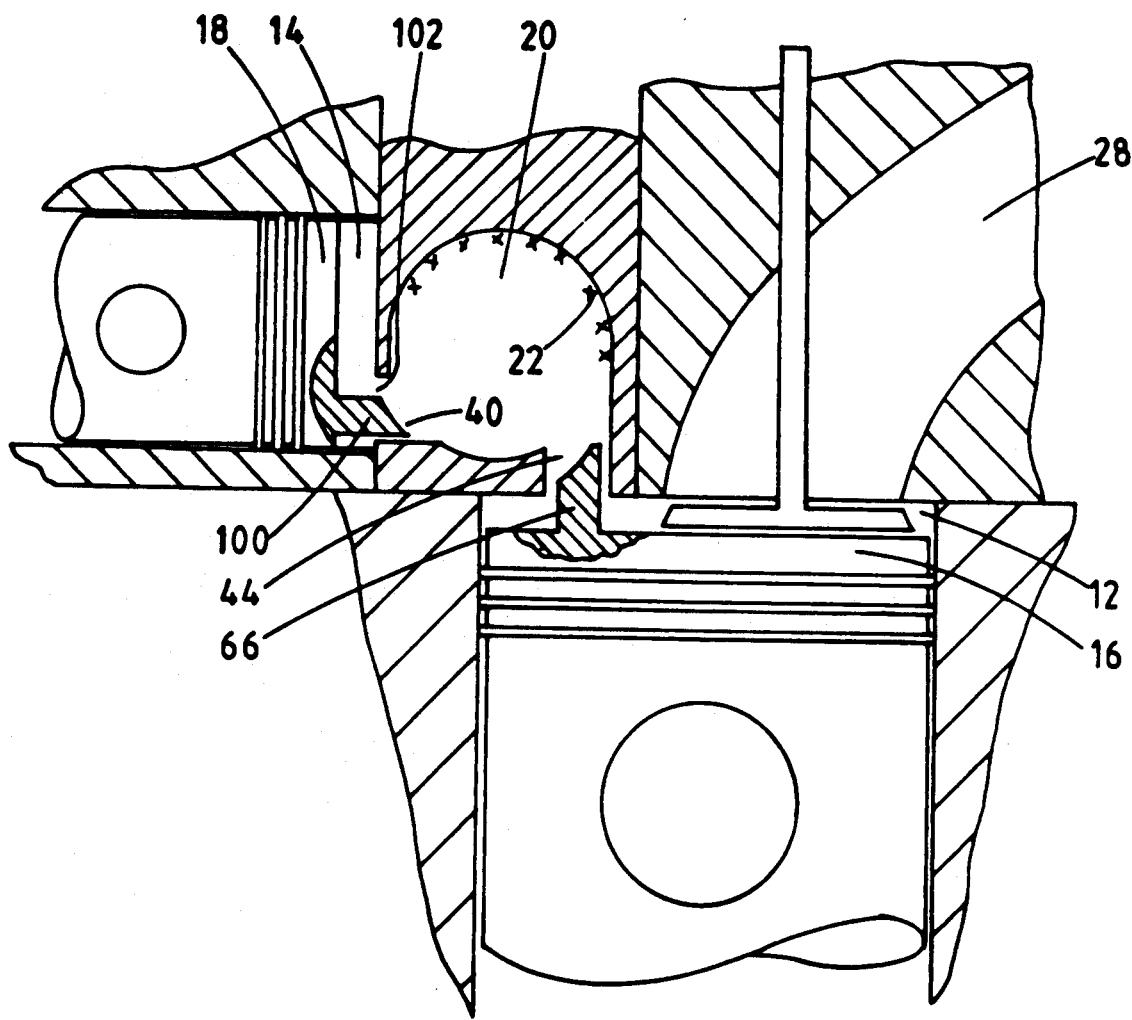
FIG. 3 is a view similar to that of FIGS. 1 and 2 of a third embodiment of internal combustion engine according to the present invention.

In the modified engine of FIG. 3, the head ends of the cylinders 12,14 are in continuous communication through the combustion chamber 20.

The pistons in both cylinders are mechanically coupled together. The pistons may be coupled in phase and move in unison, that is, they reach IDC (inner dead centre) and ODC (outer dead centre) at the same time, but the engine will operate with the second piston 18 slightly lagging behind or slightly leading the first piston 16. Preferably, there is no change in phase difference between the two pistons as engine speed increases or decreases.

The air cylinder 12 communicates with an air inlet port and an exhaust port respectively of inlet and exhaust ducts (exhaust 28 being shown).

The piston 18 is also provided with a protrusion 100' formed on its head to displace most of the volume in the cooperating aperture 40, when at or near IDC.

The combustion chamber in each of the described embodiments contains a continual ignition means, i.e. an ignition means which is continually operable. The phrase "continually operable" as used herein with reference to the ignition means refers to a type of ignition means which is active or capable of being activated over the whole of the engine cycle or over a preselected time period which is a substantial portion (e.g. greater than 25%) of the time period required for completion of one revolution of the engine. The following forms of ignition means may be used.

(1) Part or all of the wall of the combustion chamber may be formed by or covered with a ceramic material which, being a thermal insulator, reaches a very high temperature during the operation of the engine to form a hot surface ignition means. The fuel/air mixture ignites on contact with the hot ceramic surface.

(2) As an alternative to the ceramic material part or all of the combustion chamber wall may be a metal wall which, during operation of the engine, can also reach temperatures suitable for ignition.

(3) The ignition means may be in the form of a catalyst, typically platinum and/or palladium, preferably in the form of a film or coating on part or all of the internal wall or walls of the combustion chamber.

(4) A combination of any of the above may be used.

(5) Compression ignition, in which the hot gases filling the combustion chamber spontaneously ignite the fuel at the end of the compression stroke with or without the aid of the above-mentioned ignition means.

During an induction stroke air is inducted into the larger cylinder 12 through the inlet port and some of the inducted air is drawn into the small cylinder 14 through the combustion chamber. Fuel is also injected or introduced into the cylinder 14 over a preselected angle (length) of movement of the piston. Fuel is introduced into the smaller cylinder sufficiently prior to IDC at the end of the compression stroke to enable a substantial portion of the fuel to vaporise before the second piston reaches IDC. The range of movement of the second piston within which commencement of injection injection takes place is from IDC of the piston at commencement of the induction stroke to approximately 10° angle of movement before IDC at the end of the compression stroke. The preferred range over which commencement of injection takes place is from IDC at the commencement of induction stroke to the point at which the piston has completed 90% (equivalent to an angle of movement of about 144°) of its compression stroke length. The injection of fuel ends no later than IDC at the end of the compression stroke. Fuel injection may take place at any time within this range over the preselected angle but is ideally injected as early as possible in the induction stroke to allow as much time as possible for the fuel to vaporise. In the preferred form of the invention the injection of fuel is commenced immediately after commencement of the induction stroke.

After reaching ODC both pistons begin the compression stroke. During the compression stroke air is delivered to the combustion chamber 20 by the piston 16, being forced into a vortex motion inside the combustion chamber. Although the drawings show that both apertures 40 and 44 open tangentially into the combustion chamber to generate vortex motion, in an alternative form only the aperture 44 opens tangentially into the chamber. The term "tangentially" is not used herein in its strict mathematical sense but includes the arrangement where an aperture opens into the chamber in a direction which has a relatively large tangential component. Air also migrates to the cylinder 14 to mix with the air/fuel mixture in cylinder 14.

Both pistons 16 and 18 deliver their gases into the combustion chamber 20 during the compression stroke, in the case of piston 18 this being towards the end of the compression stroke. The entry of the rich fuel/air mixture into the combustion chamber is accompanied by rapid mixing preferably assisted by suitable means and devices as set out in the aforementioned specifications.

Where a catalyst or hot surface is used as the ignition means combustion is initiated at the catalysed or hot surface on contact of the fuel/air mixture with the surface. Where the ignition means is compression ignition, the fuel/air mixture in the combustion chamber spontaneously ignites. The fuel/air mixture in the smaller cylinder does not ignite prior to mixing with the air from the larger cylinder because it is too rich (or too lean). Since the fuel/air mixture forced into the combustion chamber from the smaller cylinder 14 is wholly or partially vaporised there is no delay in ignition unlike the diesel engine where the fuel is injected at IDC in the form of fuel droplets which first have to mix with the air in the combustion chamber and must then be heated up and vaporised before they can burn.

In the present invention, although the fuel is introduced into the combustion chamber in a concentrated form ( a process known as stratification) because the fuel has previously been introduced into the smaller cylinder 14 it is at least partially vaporised when introduced into the combustion chamber, thus reducing ignition delay. Combustion raises the temperature and promotes the ignition of the remaining gases. Once combustion begins the chemical reaction taking place requires extra oxygen in order to proceed and this results in an enhanced mixing motion. With catalytic or hot surface ignition the fuel is ignited on a surface of the combustion chamber and the burning fuel causes the gases to expand and move radially inwardly where a strong interaction with the airflow in the chamber creates a powerful mixing action.

The swirling vortex motion in the combustion chamber continues during the ignition period and ensures a prolonged contact with the catalyst or hot surface over a period of time to promote a rapid and complete combustion. Both pistons are then driven away from IDC allowing the burnt gases to expand and deliver work through the pistons to the engine crank shaft or crank shafts.

The protrusions 100,100' respectively on the piston 18 and cylinder wall (FIGS. 2 and 3) ensure that the fuel/air mixture in the small cylinder 14 is transferred into the combustion chamber 20 when piston 18 moves towards IDC. The protrusion enters into aperture 40 as piston 18 approaches IDC so that fuel/air mixture trapped between the head of piston 18 and the facing end wall of cylinder 14 is forced through the narrower portion of the aperture 40 into the combustion chamber. This also increases the speed of the fuel/air mixture and enhances mixing within the combustion chamber.

The shape of the protrusion 100,100' is such as to leave a gap 102 between the protrusion and the side wall of the aperture 40 to allow access to the combustion chamber for gases trapped between the head of piston 18 and the facing end wall of cylinder 14. This gap 102 may extend around the whole of the periphery of the protrusion 100 or around only part of the periphery The cross-sectional shape of the protrusion 100 may correspond to that of the aperture 40 or may be of a different cross-sectional shape which may also vary along the width or length of the protrusion. In the latter case this would result in a gap 102 which varied as the piston 18 moved towards IDC.

The aperture 40 may be of any cross-sectional shape, for example rectangular, curved such as circular or ellipsoid, or of irregular shape, as may be the cross-sectional shape of the protrusion 100.

The length of the protrusion 100 may be greater than, equal to or less than the length of the aperture 40.

A similar protrusion may also be formed on the head of piston 16, as is disclosed in the aforementioned specifications. In FIG. 3 a protrusion 66 is shown formed on the head of piston 16 and is located adjacent to one edge of the piston. This allows large inlet and exhaust ports to be provided in the cylinder head connecting with cylinder 12.

The use of a protrusion for the second piston ensures the delivery of almost all the fuel/air mixture into the combustion chamber. When used for both pistons it prolongs the period of near constant volume combustion which the engine can promote with its fast combustion process and allows larger apertures to be used to facilitate transfer of air from the inlet valve and through the combustion chamber into the minor cylinder 14 during the induction stroke.

Figure 4:
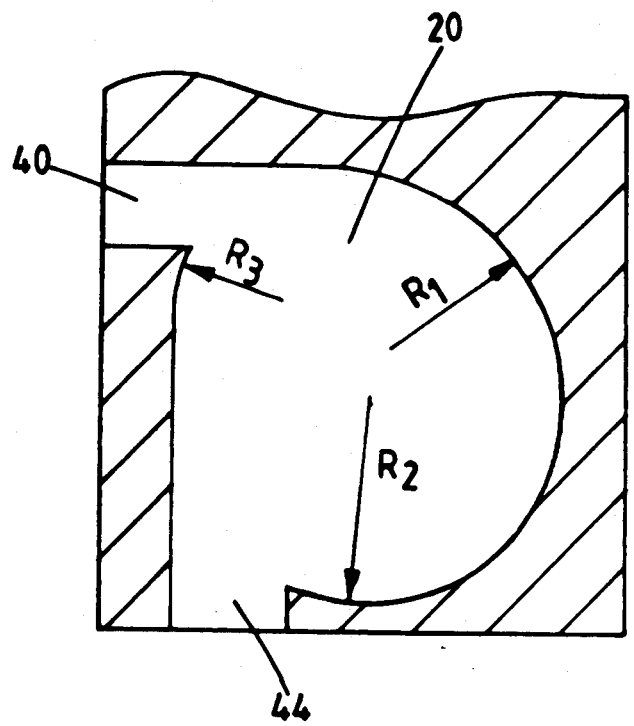
FIG. 4 is a section through a modified form of combustion chamber for an internal combustion engine according to the present invention.

Referring now to FIG. 4, this shows a section through a preferred form of combustion chamber 20. In this combustion chamber the general shape of the combustion chamber cross-section is circular (although other effectively curved configurations may be used) with a radius R1. Both inlet apertures 40 and 44 open tangentially into the combustion chamber to generate a vortex movement of gas in the combustion chamber during the compression stroke of the engine. However, the radius of curvature of the chamber is reduced over a portion of the circumference immediately before the apertures 40 and 44 (in the direction of movement of gases in the chamber). The radii of curvature immediately before the apertures 40 and 44 are respectively R3 and R2. Radii R2 and R3 may be the same or different.

It will, of course, be appreciated that both or only one of radii R2 and R3 may differ from radius R1.

The effect of the change in curvature is to displace the circulating stream of gas in the combustion chamber relative to the streams entering the chamber through apertures 40 and 44. This allows improved mixing of the gases and reduces any tendency of the circulating gases in the combustion chamber to obstruct entry of gases through apertures 40 and 44.

The main advantage of the above-described embodiments of a segragating engine over the diesel segregating engine is that liquid fuel can be introduced into the smaller cylinder 14 much earlier i.e. at any time from the commencement of the induction stroke to 10° angular movement from IDC at the end of the compression stroke. This allows the fuel much more time to vaporise before it is forced to enter the combustion chamber. Ignition and combustion of gaseous fuel is much more rapid than that of liquid fuel, eliminating the ignition lag and longer combustion period of a diesel engine and giving the present invention a capability for efficient high speed operation.

Liquid fuel injected during the induction stroke can be injected at relatively low pressures in comparison with a diesel engine. Less volatile liquid fuels can also be preheated, for example by exchanging heat with engine cooling water or exhaust gases. The less volatile liquid fuels may also be injected at higher pressures to facilitate a finer atomisation of the fuel which in turn assists in vaporisation.

Fuel in the form of a gas may be used in the engine on a duel fuel basis. A small quantity of fuel in gaseous form can be mixed with air in the air intake to the larger cylinder 12 (the mixture being below the lean flammability limit) whilst the majority of the fuel is injected, in liquid form, into the smaller cylinder 14. A small amount of gaseous fuel in a large quantity of air can remain unaffected by the ignition means in the combustion chamber.

It will be appreciated by those skilled in the art that the embodiments disclosed in FIGS. 1 and 2 may be used together or separately in an engine and may be combined with any of the embodiments described in the aforementioned prior specifications.

Although each combustion chamber referred to above is described as having a curved surface or curved cross-sectional shape it will be appreciated that the term "curved" includes surfaces which are formed by a number of straight or curved portions or a combination of both such as in a combustion chamber in the form of a polyhedron.

The crown of the first piston 16, or a portion thereof, may be provided with or formed of ceramic material which forms a hot surface during operation of the engine and assists combustion. The ceramic material may advantageously be coated with catalytic material.

When fuelling a multi-cylinder engine of this type over the full range of fuel requirement, a condition may be reached at low loads when the fuel/air ratio of the mixture in the smaller cylinder falls within the flammability limits, giving rise to ignition of the mixture in the smaller cylinder by compression ignition. This can be avoided by controlling the amount of fuel injected such that when, for example, the fuel/air ratio of the mixture falls to within a preselected value above the rich flammability limit the fuel injected into some of the cylinders is increased a preset amount to maintain the mixture above the rich flammability limit whilst the fuel injected into the other cylinders is immediately reduced to render the fuel/air ratio of their mixtures below the lean flammability limit. This ensures that the engine continues to operate at the required load without the danger of unwanted ignition during the engine cycle. Once the fuel requirement of the engine is such that the fuel/air ratio of the mixture in each cylinder should be below the lean flammability limit then the amount of fuel injected into each cylinder is adjusted to the same value to provide such a fuel/air ratio in each cylinder. It will be appreciated that the reverse operation occurs when the fuel/air ratio of the mixture in each cylinder is increased within a preselected value below the lean flammability limit. The above applies to the use of a catalytic ignition means which is capable of igniting mixtures below the lean flammability limit.

I claim:

1. An internal combustion engine comprising at least one pair of first and second cylinders, said first cylinder having a larger swept volume than said second cylinder; a combustion chamber communicating with said cylinders;
   first means for delivering a charge of substantially air into said first cylinder;
   second means for delivering a charge of liquid fuel into said second cylinder;
   respective first and second pistons movable in said cylinders;
   continually operable ignition means in said combustion chamber;
   control means for controlling said second means to commence delivery of said charge of fuel into said second cylinder during movement of said second piston between a first position wherein said piston is at the commencement of its induction stroke and a second position wherein said piston is not less than 10° angle of movement from the end of its compression stroke and to terminate delivery of said charge of fuel when said second piston reaches a third position no later than the inner dead centre position of the piston at the end of the compression stroke; and
   means for inhibiting movement of fuel/air mixture from said second cylinder into said combustion chamber prior to said second piston reaching a fourth position wherein said piston has completed at least substantially 80% of its compression stroke length and means for inducing a vortex motion in air delivered to said combustion chamber from said first cylinder for assisting rapid mixing in said combustion chamber of fuel/air mixture from said second cylinder and air from said first cylinder during combustion.

2. An engine as claimed in claim 1 wherein said second piston reaches its second position when it has completed not more than 90% of its compression stroke length.

3. An engine as claimed in claim 1 wherein said pistons move together towards and away from their inner dead centre positions over at least 70% of each stroke length of the engine cycle.

4. An engine as claimed in claim 1 wherein said control means is operable to cause said second means to commence delivery of said charge of fuel to said second cylinder during the induction stroke of said second piston.

5. An engine as claimed in claim 4 wherein said control means is operable to cause said second means to commence delivery of said charge of fuel to said second cylinder immediately after said second piston commences its induction stroke.

6. An engine as claimed in claim 1 wherein said first piston has a crown formed at least partially of a ceramic material.

7. An engine as claimed in claim 6 wherein said ceramic material has catalytic material thereon.

8. An engine as claimed in claim 1 wherein said first means is operable to deliver a charge of unthrottled air to said first cylinder.

9. An engine as claimed in claim 1 wherein said first means is operable to deliver a charge of fuel/air mixture to said first cylinder, said mixture being below the lean flammability limit.

10. An engine as claimed in claim 1 wherein said ignition means comprises a hot surface ignition means.

11. An engine as claimed in claim 10 wherein said hot surface ignition means comprises at least a portion of a wall of the combustion chamber formed of a ceramic material.

12. An engine as claimed in claim 1 wherein said ignition means comprises catalytic material.

13. An engine as claimed in claim 1 wherein said second cylinder comprises an extension of said first cylinder and said second piston comprises a protrusion on the crown of said first piston and wherein the stroke of said first piston is such that said second piston projects into said second cylinder at its outer dead centre position.

14. An engine as claimed in claim 13 wherein said combustion chamber is formed in said second piston and comprises respective first and second aperture means opening into said first and second cylinders for enabling flow of air and air/fuel mixture from said cylinders to said combustion chamber.

15. An engine as claimed in claim 14 wherein said second cylinder has a protrusion formed on an end wall thereof arranged to project into said second aperture to assist in displacing air/fuel mixture into said combustion chamber when said second piston approaches its inner dead centre position.

16. An engine as claimed in claim 1 wherein said second piston has a protrusion formed thereon arranged to project into an aperture of said combustion chamber communicating with said second cylinder to assist in displacing air/fuel mixture into said combustion chamber when said second piston approaches its inner dead centre position.

17. An engine as claimed in claim 1 wherein the combustion chamber is of substantially curved cross-section and having first and second inlet apertures for input respectively of air and fuel/air mixture, and wherein the radius of curvature of the cross-section of the chamber is reduced over a portion of the chamber circumference immediately before at least one of said apertures in a direction of circulation of gase in said chamber.

18. An engine as claimed in claim 1 having a plurality of said first and second cylinders and a plurality of said first and second pistons; and wherein said control means is operable to monitor the fuel/air mixture ratio in each said second cylinder and to adjust the quantity of fuel injected into at least one of said second cylinders to maintain the fuel/air ratio therein above the rich flammability limit of the fuel and to adjust the amount of fuel injected into the remaining said second cylinders to render the fuel/air mixture ratio below the lean flammability limit of the fuel when the fuel/air mixture ratio in said second cylinders falls to within a preselected value above the rich flammability limit to prevent unwanted ignition during the engine cycle.

19. An engine as claimed in claim 18 wherein said control means is operable to adjust the quantity of fuel injected into at least one of said second cylinders to render the fuel/air ratio therein above the rich flammability limit of the fuel and to adjust the amount of fuel injected into the remaining said second cylinders to maintain the fuel/air mixture ratio below the lean flammability limit of the fuel when the fuel/air mixture ratio in said second cylinders rises to within a preselected value below the lean flammability limit to prevent unwanted ignition during the engine cycle.

20. A compression ignition engine comprising at least one pair of first and second cylinders, said first cylinder having a larger swept volume than said second cylinder;
 a combustion chamber communicating with said cylinders;
 first means for delivering a charge of substantially air to said first cylinder;
 second means for delivering a charge of liquid fuel into said second cylinder;
 respective first and second pistons movable in said cylinders;
 control means for controlling said second means to commence delivery of said charge of fuel into said second cylinder during movement of said second piston between a first position wherein said piston is at the commencement of its induction stroke and a second position wherein said piston is not less than 10° angle of movement from the end of its compression stroke and to terminate delivery of said charge of fuel when said second piston reaches a third position no later than the inner dead centre position of the piston at the end of the compression stroke; and 21. An engine as claimed in claim 20 further comprising continually operable ignition means in said combustion chamber 22. An engine as claimed in claim 20 wherein said second piston reaches its second position when it has completed not more than 90% of its compression stroke length.

23. An engine as claimed in claim 20 wherein said pistons move together towards and away from their inner dead centre positions over at least 70% of each stroke length of the engine cycle.

24. An engine as claimed in claim 20 wherein said control means is operable to cause said second means to commence delivery of said charge of fuel to said second cylinder during the induction stroke of said second piston.

25. An engine as claimed in claim 24 wherein said control means is operable to cause said second means to commence delivery of said charge of fuel to said second cylinder immediately after said second piston commences its induction stroke.

26. An engine as claimed in claim 20 wherein said first piston has a crown formed at least partially of a ceramic material.

27. An engine as claimed in claim 26 wherein said ceramic material has catalytic material thereon.

28. An engine as claimed in claim 20 wherein said first means is operable to deliver a charge of unthrottled air to said first cylinder.

29. An engine as claimed in claim 20 wherein said first means is operable to deliver a charge of fuel/air mixture to said first cylinder, said mixture being below the lean flammability limit.

30. An engine as claimed in claim 20 wherein said ignition means comprises a hot surface ignition means.

31. An engine as claimed in claim 30 wherein said hot surface ignition means comprises at least a portion of a wall of the combustion chamber formed of a ceramic material.

32. An engine as claimed in claim 20 wherein said ignition means comprises catalytic material.

33. An engine as claimed in claim 20 wherein said second cylinder comprises an extension of said first cylinder and said second piston comprises a protrusion on the crown of said first piston and wherein the stroke of said first piston is such that said second piston projects into said second cylinder at its outer dead centre position.

34. An engine as claimed in claim 33 wherein said combustion chamber is formed in said second piston and comprises respective first and second aperture means opening into said first and second cylinders for enabling flow of air and air/fuel mixture from said cylinders to said combustion chamber.

35. An engine as claimed in claim 34 wherein said second cylinder has a protrusion formed on an end wall thereof arranged to project into said second aperture to assist in displacing air/fuel mixture into said combustion chamber when said second piston approaches its inner dead centre position.

36. An engine as claimed in claim 20 wherein said second piston has a protrusion formed thereon arranged to project into an aperture of said combustion chamber communicating with said second cylinder to assist in displacing air/fuel mixture into said combustion chamber when said second piston approaches its inner dead centre position.

37. An engine as claimed in claim 20 wherein the combustion chamber is of substantially curved cross-section and having first and second inlet apertures for input respectively of air and fuel/air mixture, and wherein the radius of curvature of the cross-section of the chamber is reduced over a portion of the chamber circumference immediately before at least one of said apertures in a direction of circulation of gases in said chamber.

38. An engine as claimed in claim 20 having a plurality of said first and second cylinders and a plurality of said first and second pistons; and wherein said control means is operable to monitor the fuel/air mixture ratio in each said second cylinder and to adjust the quantity of fuel injected into at least one of said second cylinders to maintain the fuel/air ratio therein above the rich flammability limit of the fuel and to adjust the amount of fuel injected into the remaining said second cylinders to render the fuel/air mixture ratio below the lean flammability limit of the fuel when the fuel/air mixture ratio in said second cylinders falls to within a preselected value above the rich flammability limit to prevent unwanted ignition during the engine cycle.

39. An engine as claimed in claim 38 wherein said control means is operable to adjust the quantity of fuel injected into at least one of said second cylinders to render the fuel/air ratio therein above the rich flammability limit of the fuel and to adjust the amount of fuel injected into the remaining said second cylinders to maintain the fuel/air mixture ratio below the lean flammability limit of the fuel when the fuel/air mixture ratio in said second cylinders rises to within a preselected value below the lean flammability limit to prevent unwanted ignition during the engine cycle.

* * * * *

UNITED STATES PATENT AND TRADEMARK OFFICE
CERTIFICATE OF CORRECTION

PATENT NO. : 5,009,207

DATED : April 23, 1991

INVENTOR(S) : Merritt

It is certified that error appears in the above-identified patent and that said Letters Patent is hereby corrected as shown below:

At the end of claim 20 insert:

--means for inhibiting movement of fuel/air mixture from said second cylinder into said combustion chamber prior to said second piston reaching a fourth position wherein said piston has completed at least substantially 80% of its compression stroke length and means for inducing a vortex motion in air delivered to said combustion chamber from said first cylinder for assisting rapid mixing in said combustion chamber of fuel/air mixture from said second cylinder and air from said first cylinder during combustion.--

At the end of claim 21 insert a period.

Signed and Sealed this

Fourth Day of January, 1994

Attest:

BRUCE LEHMAN

Attesting Officer

Commissioner of Patents and Trademarks